United States Patent [19]

Wyatt, Jr. et al.

[11] 4,057,944
[45] Nov. 15, 1977

[54] THERMALLY INSULATED PANEL

[75] Inventors: William Burk Wyatt, Jr., Nashville, Tenn.; Bruce D. Benefield, Huntsville, Ala.

[73] Assignee: Videre Corporation, Nashville, Tenn.

[21] Appl. No.: 776,610

[22] Filed: Mar. 11, 1977

[51] Int. Cl.² .......................... E04C 2/40; E04B 3/70
[52] U.S. Cl. .................................. 52/309.11; 52/618; 52/619; 428/34
[58] Field of Search .................. 52/309.9, 309.11, 618, 52/619, 620, 580, 731; 428/34

[56] References Cited

U.S. PATENT DOCUMENTS

| 1,000,758 | 8/1911 | Rude | 52/618 |
|---|---|---|---|
| 2,196,781 | 4/1940 | Saino et al. | 52/618 |
| 2,576,073 | 11/1951 | Kropa et al. | 52/309.9 X |
| 3,786,613 | 1/1974 | Shepheard | 52/619 |
| 3,828,502 | 8/1974 | Carlsson | 52/309.11 |
| 3,906,697 | 9/1975 | Rijnders | 52/619 |
| 3,987,588 | 10/1976 | Imperial et al. | 52/620 X |
| 3,992,839 | 11/1976 | La Borde | 52/619 X |

FOREIGN PATENT DOCUMENTS

| 1,081,647 | 5/1960 | Germany | 52/586 |
|---|---|---|---|
| 960,501 | 3/1957 | Germany | 52/618 |
| 754,299 | 8/1956 | United Kingdom | 52/309.8 |

Primary Examiner—Alfred C. Perham
Attorney, Agent, or Firm—Parmelee, Miller, Welsh & Kratz

[57] ABSTRACT

A thermally insulated panel comprises a pair of spaced facing channels, preferably of metal, which are fixed together in a structurally secure manner by use of a serrated rigid plastic sheet disposed therebetween and by a closed-cell foamed polymeric material which fills the voids between the rigid sheet and the channels. The channels are bound together and the spacing between them is sealed by means on the rigid plastic sheet which, in addition to securing the channels together, is permanently and monolithically sealed in place by the closed-cell foamed polymeric material. A thermal break is formed to prevent loss of heat across the shell of the panel.

8 Claims, 6 Drawing Figures

THERMALLY INSULATED PANEL

BACKGROUND OF THE INVENTION

In the formation of highly insulated panels for use in providing thermal insulation, the problem exists of passage of heat along the panel shell itself. Especially where metal, because of its structural stability and resistance to the elements, is used, the problem exists that although the panel shell may be filled with an insulating material, colder temperatures and condensation often result along the panel because of conduction of the panel shell itself.

The present invention provides a thermally insulated panel with a unique thermal break which prevents loss of heat through the panel and along the outer shell of the panel and provides for complete thermal insulation to prevent loss of heat from one side or face of the panel to the other side.

BRIEF DESCRIPTION OF THE INVENTION

A thermally insulated panel member having a thermal break is comprised of a pair of spaced channel-shaped sections which face each other, both sections having sidewalls with inwardly extending flanges along the complete length of the sidewalls. A rigid plastic sheet having a serrated cross-section is provided between the channels, the serrations of which contact the inner surfaces of the channels and may have means thereon to lock with means provided on the inner surfaces of the channels to lock the sheet in place and add structural stability to the panel. The rigid plastic sheet has means thereon for contacting the inwardly directed flanges on the channel for binding the channels together and for sealing the spacing between the opposed channels and providing a closed shell. The spacing between the rigid plastic sheet and the channels is filled with a foamed-in-place closed-cell polymeric material, such as expanded low-density polyurethane foam, to provide a monolithically sealed and structurally stable panel which is completely thermally insulated and has a thermal break therein to prevent conduction of heat along the panel shell.

DETAILED DESCRIPTION OF THE PREFERRED EMBODIMENT

A thermally insulated panel member is described which provides structural stability, low cost production, and an efficient thermal break for use with window frames, door frames, wall portions and other panel uses.

Figure 2:
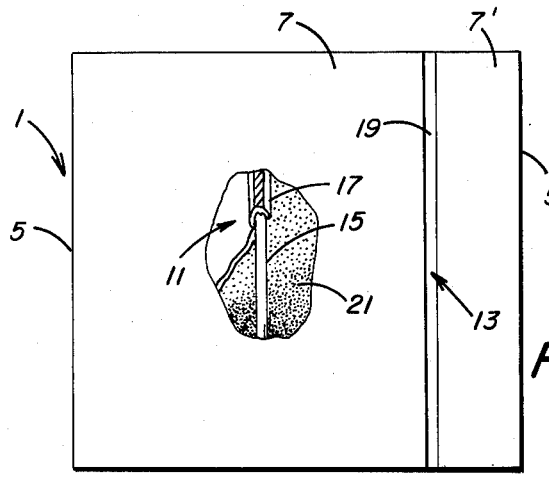
FIG. 2 is a side elevational view of the panel of FIG. 1 with a section of a channel cut away to show a portion of the interior thereof.
Figure 3:
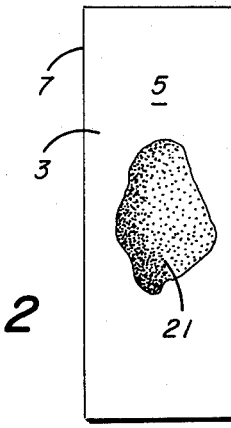
FIG. 3 is an end elevation view of the panel of FIG. 1 also with a section of a channel cut away.
Figure 1:
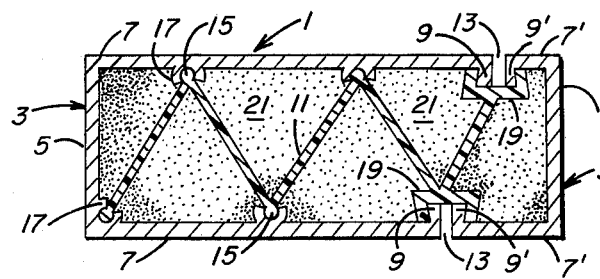
FIG. 1 is a cross-sectional view of a thermally insulated panel constructed according to the present invention.

Referring now to FIG. 1, the panel member 1 comprises a pair of spaced channel-shaped sections 3 and 3', which are preferably formed from metal such as of aluminum, but which may be formed of a polyvinyl material, such as polyvinyl chloride or the like. For brevity, metal will be used hereinafter to define the material from which the channel members are formed. The channel members have a base 5 and 5' and pairs of opposed walls 7 and 7', the metal wall sections having inwardly directed flanges 9 and 9' respectively extending along both sides thereof, with the open portions of the channels facing each other.

A rigid plastic sheet 11 of serrated cross-section is situate between the channels, portions of the sheet contacting the inner surface of each of the channels 3 and 3'. The rigid plastic sheet, preferably of polystyrene or polyvinyl chloride, has means thereon to contact the flanges 9 and 9' of both sides of the channels 3 and 3' to seal the spacing 13 between the spaced channel walls 7 and 7' and the area of the flanges 9 and 9' to provide a closed shell for the panel 1.

There are preferably provided on the serrations of the rigid plastic sheet 11 means to lock the sheet in place between the two channel members which may comprise raised bosses 15 which interlock with means 17, such as grooved extensions, on the inner surfaces of the metal channels.

The means for contact of the flanges 9 and 9' are illustrated generally as a U-shaped member 19 which contacts and encloses the flanges of both of the channels, tightly binds the channels together and seals the spacing between the channels and provides a thermal break in the shell of the panel.

Filling the spaces between the rigid plastic sheet 11 and the walls 7, 7' and bosses 5, 5' of the channels, there is provided a closed-cell polymeric foam material 21. While the closed-cell polymeric foam material may comprise various types of such material, expanded, low-density polyurethane is a preferred material. By low density there is meant expanded foam of about 1.5 to 4.0 pounds per cubic foot density. With the polyurethane foamed in place, the material forms a monolithic seal to completely seal any cavities between the rigid plastic sheet and the channels to provide exceptional structural stability in the panel and exceptional insulating properties. The term "monolithic" seal is used herein to denote a seal formed such that the resulting panel structure constitutes a unitary whole exhibiting uniform structural stability throughout.

Figure 4:
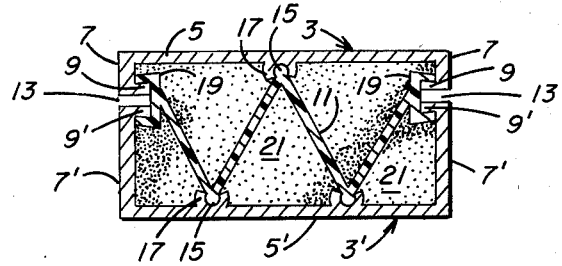
FIG. 4 is a cross-sectional view of an alternate panel formed according to the present invention.
Figure 5:
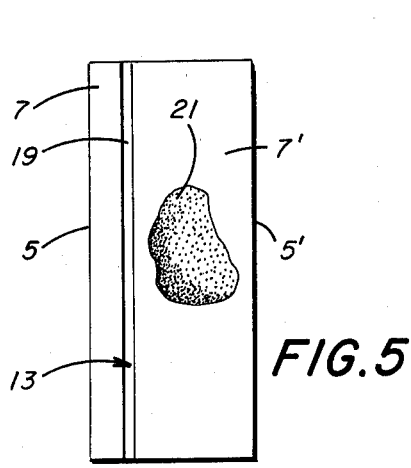
FIG. 5 is a side elevational view of the panel of FIG. 4 with a section of a channel cut away to expose a portion of the interior thereof.
Figure 6:
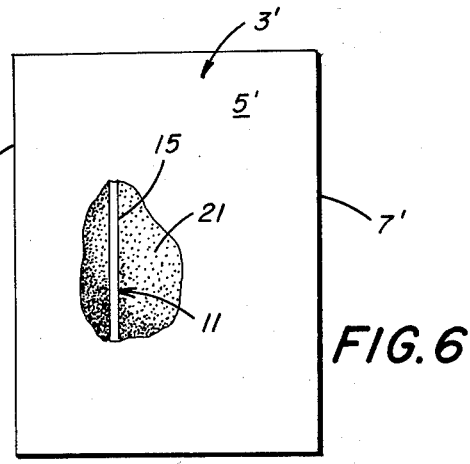
FIG. 6 is an end elevational view of the panel of FIG. 4 also with a portion of a channel removed to expose the interior of the panel.

As illustrated in FIG. 4, the spacing 13 forming the thermal break may be on the narrow side of a panel-shaped member such as for use in framing.

In order to increase adhesion of the closed-cell polymeric foam material to the inner surfaces of the channels, those surfaces are preferably milled rough or unfinished to provide a rough surface for contact with the foam.

One method of forming the panel of the present invention comprises forming both channels as a continuous hollow conduit, either molded or extruded, having the flanges positioned on the inner surface as extensions and having the grooved extensions formed on the interior of the conduit. The conduit is cut to a specified length and the rigid plastic sheet of serrated cross-section inserted into the conduit with the raised bosses inserted into the grooved extensions and the means for contacting the flanges enclosing those flanges. With means for closing one end of the conduit in place, the polymeric material is poured into the conduit and foamed in place to form a closed-cell polymeric material between the rigid plastic sheet and the channels. The conduit is then formed into two spaced channels by saw cutting or otherwise removing a strip of material from the channels to expose the rigid plastic sheet, providing a complete break in the conduit. the panel may then be treated in the conventional manner to add end plates to the channels, if desired, and possibly place a facing of decorative sheet material over the outer surface of the panel, if desired.

The panels of the present invention provide structurally strong panels which enable use of less or thinner material for the channels than would normally be used because of the structural stability provided to the panels by the rigid plastic sheet therein and the complete filling of any voids with a closed-cell polymeric foam material. For example, where extruded aluminum or rigid polyvinyl chloride is used to form the channels, we believe that the thickness of the aluminum or the polyvinyl chloride could be 65 percent or less of the structural thickness now used for panels without using our novel construction.

Because of the structural stability and thermal insulative properties, panels could be formed for use in window and door frames, wall paneling, siding, as ceiling panels, roofing panels and the like, with known interlocking means used to affix and seal two or more panels together in a unique and strong thermally insulative design.

We claim:
1. A thermally insulated panel member comprising:
a pair of spaced channel-shaped sections having inwardly extending flanges along both sides thereof, facing each other;
a rigid plastic sheet of serrated cross-section situate between said channels and contacting the inner surface of each of said channels;
said plastic sheet having means thereon to contact the flanges of both of said channels to bind the channels together and seal the spacing therebetween to provide a closed shell; and
closed-cell foamed polymeric material filling and monolithically sealing said shell to form a panel.

2. A thermally insulated panel member as defined in claim 1 wherein the inner surfaces of said channels have means thereon to lock said rigid plastic sheet in position within the panel.

3. A thermally insulated panel member as defined in claim 2 wherein said rigid plastic sheet has means thereon for locking said sheet to said means on said inner surfaces of the channels.

4. A thermally insulated panel member as defined in claim 1 wherein said means on said plastic sheet contacting said flanges comprises a U-shaped member for contacting and enclosing the flanges of both of said channels to bind the channels together and seal the spacing therebetween.

5. A thermally insulated panel member as defined in claim 1 wherein said closed-cell foamed polymeric material is foamed-in-place low-density, expanded polyurethane.

6. A thermally insulated panel member as defined in claim 1 wherein said rigid plastic sheet is formed from polystyrene.

7. A thermally insulated panel member as defined in claim 1 wherein said channels are formed of aluminum.

8. A thermally insulated panel member comprising:
a pair of spaced channel-shaped sections having inwardly extending flanges along both sides thereof, facing each other;
a rigid plastic sheet of serrated cross-section situate between said channels and contacting the inner surface of each of said channels;
means on said plastic sheet for locking said sheet to said channels;
means on the inner surfaces of the channels for cooperating with said locking means of the plastic sheet;
means on the plastic sheet comprising U-shaped members for contacting and enclosing the flanges of both said channels to bind the channels together and seal the spacing therebetween and provide a closed shell; and
closed-cell foamed polymeric material filling and monolithically sealing said shell to form a panel.

* * * * *